(12) United States Patent
Ng et al.

(10) Patent No.: US 12,300,105 B2
(45) Date of Patent: May 13, 2025

(54) IDENTIFYING PARKABLE AREAS FOR AUTONOMOUS VEHICLES

(71) Applicant: Waymo LLC, Mountain Avenue, CA (US)

(72) Inventors: Chi Yeung Jonathan Ng, San Francisco, CA (US); Anthony Ronald Grue, Thousand Oaks, CA (US); Qichi Yang, Foster City, CA (US); Kevin Poulet, Mountain View, CA (US); Zijian Guo, Sunnyvale, CA (US); David Harrison Silver, San Carlos, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/236,693

(22) Filed: Apr. 21, 2021

(65) Prior Publication Data
US 2022/0343763 A1 Oct. 27, 2022

(51) Int. Cl.
  *G08G 1/14* (2006.01)
  *G06N 5/04* (2023.01)
  *G06N 20/00* (2019.01)

(52) U.S. Cl.
  CPC .............. *G08G 1/143* (2013.01); *G06N 5/04* (2013.01); *G06N 20/00* (2019.01)

(58) Field of Classification Search
  CPC ........... G08G 1/143; G06N 5/04; G06N 20/00
  See application file for complete search history.

(56) References Cited

U.S. PATENT DOCUMENTS

| | | | |
|---|---|---|---|
| 10,202,118 B2 | 2/2019 | Russell et al. | |
| 10,235,580 B2 | 3/2019 | Belzner et al. | |
| 10,293,822 B1 | 5/2019 | Silver et al. | |
| 10,457,210 B2 | 10/2019 | Leem et al. | |
| 2009/0243889 A1* | 10/2009 | Suhr | G08G 1/168 340/932.2 |
| 2013/0046795 A1* | 2/2013 | Borgerson | G06Q 10/06 707/E17.011 |

(Continued)

FOREIGN PATENT DOCUMENTS

| | | |
|---|---|---|
| CN | 102635259 A | 8/2012 |
| CN | 108121343 A | 6/2018 |

(Continued)

OTHER PUBLICATIONS

The Extended European Search Report for European Patent Application No. 22167486.4, Sep. 16, 2022.

(Continued)

*Primary Examiner* — Joseph H Feild
*Assistant Examiner* — Rufus C Point
(74) *Attorney, Agent, or Firm* — Botos Churchill IP Law

(57) ABSTRACT

Aspects of the disclosure provide for the identification of parkable areas. In one instance, observations of parked vehicles may be identified from logged data. The observations may be used to determine whether a sub-portion of an edge of a roadgraph corresponds to a parkable area. In some examples, the edge may define a drivable area in the roadgraph. In addition, map information is generated based on the determination of whether the sub-portion of the edge corresponds to the parkable area.

21 Claims, 11 Drawing Sheets

(56) References Cited

U.S. PATENT DOCUMENTS

| | | | |
|---|---|---|---|
| 2014/0085112 A1* | 3/2014 | Gruteser | G08G 1/147 |
| | | | 340/932.2 |
| 2014/0340242 A1* | 11/2014 | Belzner | G08G 1/143 |
| | | | 340/932.2 |
| 2015/0124093 A1 | 5/2015 | Wang et al. | |
| 2017/0267233 A1 | 9/2017 | Minster et al. | |
| 2018/0113456 A1 | 4/2018 | Iagnemma et al. | |
| 2018/0113470 A1 | 4/2018 | Iagnemma et al. | |
| 2018/0232583 A1 | 8/2018 | Wang et al. | |
| 2018/0349792 A1* | 12/2018 | Zhao | G06N 20/00 |
| 2019/0066515 A1* | 2/2019 | Dyer | G05D 1/0212 |
| 2019/0073901 A1* | 3/2019 | Shurkhovetskyy | G08G 1/143 |
| 2019/0155283 A1* | 5/2019 | Herbach | G06Q 50/30 |
| 2020/0005055 A1 | 1/2020 | Cunha et al. | |
| 2020/0108808 A1* | 4/2020 | Zhou | B60T 8/58 |
| 2020/0132477 A1 | 4/2020 | Averilla | |
| 2020/0191587 A1* | 6/2020 | Fuchs | G01C 21/3446 |
| 2020/0200562 A1* | 6/2020 | Vereshchagin | G06F 16/285 |
| 2020/0209001 A1* | 7/2020 | Demerly | G01C 21/3453 |
| 2020/0257909 A1* | 8/2020 | Korman | G08G 1/0141 |
| 2020/0258385 A1 | 8/2020 | Mahajan | |
| 2021/0096565 A1* | 4/2021 | Xie | B62D 15/0285 |
| 2021/0302180 A1* | 9/2021 | Kim | G01C 21/3867 |
| 2021/0302968 A1* | 9/2021 | Dorum | G01C 21/32 |
| 2022/0135077 A1* | 5/2022 | Moon | B60W 10/30 |
| | | | 701/26 |
| 2022/0180214 A1* | 6/2022 | Cervantes | G06N 3/08 |
| 2022/0222597 A1* | 7/2022 | Neese | G06Q 10/06311 |

FOREIGN PATENT DOCUMENTS

| | | |
|---|---|---|
| CN | 109890677 A | 6/2019 |
| CN | 107430815 B | 1/2022 |
| JP | 2005024507 A | 1/2005 |
| JP | 2006248383 A | 9/2006 |

OTHER PUBLICATIONS

Templeton, Brad, How Self-Driving Cars Can Figure Out Parking, https://www.forbes.com/sites/bradtempleton/2019/06/25/how-self-driving-cars-can-figure-out-parking/?sh=3d18cc5b12a2, downloaded from the internet 2021, pp. 1-7.

Examination Report for European Patent Application No. 22167486.4, Oct. 15, 2024, 6 Pages.

Bock, et al., "Learning On-Street Parking Maps from Position Information of Parked Vehicles", Geospatial Data in a Changing World, Springer International Publishing Switzerland, 2016, pp. 297-314.

Mathur, et al., "ParkNet: Drive-by Sensing of Road-Side Parking Statistics", MobiSys, 2010, pp. 123-136.

The First Office Action for Chinese Patent Application No. 202210423931.7, Dec. 6, 2024, 35 Pages.

Notice of Allowance for Chinese Patent Application No. 202210423931.7, Mar. 13, 2025, 7 Pages.

* cited by examiner

IDENTIFYING PARKABLE AREAS FOR AUTONOMOUS VEHICLES

BACKGROUND

Autonomous vehicles, for instance, vehicles that may not require a human driver, can be used to aid in the transport of passengers or items from one location to another. Such vehicles may operate in a fully autonomous mode where passengers may provide some initial input, such as a pickup or destination location, and the vehicle maneuvers itself to that location. When approaching the location or at any point during a trip, an autonomous vehicle may continuously look for locations to stop the vehicle. These locations may be used, for example, for brief stops to pick up and/or drop off passengers and/or goods for example, for a transportation service. Typically, autonomous vehicles may look for such locations when the vehicle is within some distance of a destination.

BRIEF SUMMARY

Aspects of the disclosure provide a method of identifying parkable areas. The method includes identifying, by one or more processors, from logged data, observations of parked vehicles; using, by the one or more processors, the observations to determine whether a sub-portion of an edge of a roadgraph corresponds to a parkable area, wherein the edge defines a drivable area in the roadgraph; and generating, by the one or more processors, map information based on the determination of whether the sub-portion of the edge corresponds to the parkable area.

In one example, the method also includes using the observations to determine whether a second sub-portion of the edge corresponds to a second parkable area. In another example, the method also includes, further analyzing the observations to determine whether the parkable area is left of the edge. In another example, the method also includes, further analyzing the observations to determine whether the parkable area is along the edge. In another example, the method also includes, further analyzing the observations to determine whether the parkable area is between the edge and a second edge of the roadgraph. In another example, the method also includes, further analyzing the observations to determine a width of the parkable area. In another example, the method also includes, further analyzing the observations to determine a percentage of time that the parkable area was occupied by a vehicle. In another example, the method also includes, further analyzing the observations to determine likelihoods of the parkable area being available during a plurality of different periods of time. In another example, the method also includes, using the observations to train a machine learned model to provide a likelihood of the parkable area being occupied at some point in the future. In this example, the method also includes further analyzing the observations to determine a percentage of time that the parkable area was occupied by a vehicle, and using the percentage of time to train the model. In addition or alternatively, the method also includes providing the model to an autonomous vehicle to enable the autonomous vehicle to use the map information to make driving decisions. In another example, the method also includes, using the map information to identify potential locations for a vehicle to stop and pick up or drop off passengers or goods.

Another aspect of the disclosure provides a system for identifying parkable areas. The system includes memory storing logged data and one or more processors. The one or more processors are configured to identify from the stored logged data, observations of parked vehicles; use the observations to determine whether a sub-portion of an edge of a roadgraph corresponds to a parkable area, wherein the edge defines a drivable area in the roadgraph; and generate map information based on the determination of whether the sub-portion of the edge corresponds to the parkable area.

In one example, the one or more processors are further configured to use the observations to determine whether a second sub-portion of the edge corresponds to a second parkable area. In another example, the one or more processors are further configured to further analyze the observations to determine whether the parkable area is between the edge and a second edge of the roadgraph. In another example, the one or more processors are further configured to further analyze the observations to determine a percentage of time that the parkable area was occupied by a vehicle. In another example, the one or more processors are further configured to further analyze the observations to determine likelihoods of the parkable area being available during a plurality of different periods of time. In another example, the one or more processors are further configured to provide the map information to an autonomous vehicle to enable the autonomous vehicle to use the map information to make driving decisions. In another example, the one or more processors are further configured to use the observations to train a machine learned model to provide a likelihood of the parkable area being occupied at some point in the future. In another example, the one or more processors are further configured to use the map information to identify potential locations for a vehicle to stop and pick up or drop off passengers or goods.

DETAILED DESCRIPTION

Overview

Figure 1:
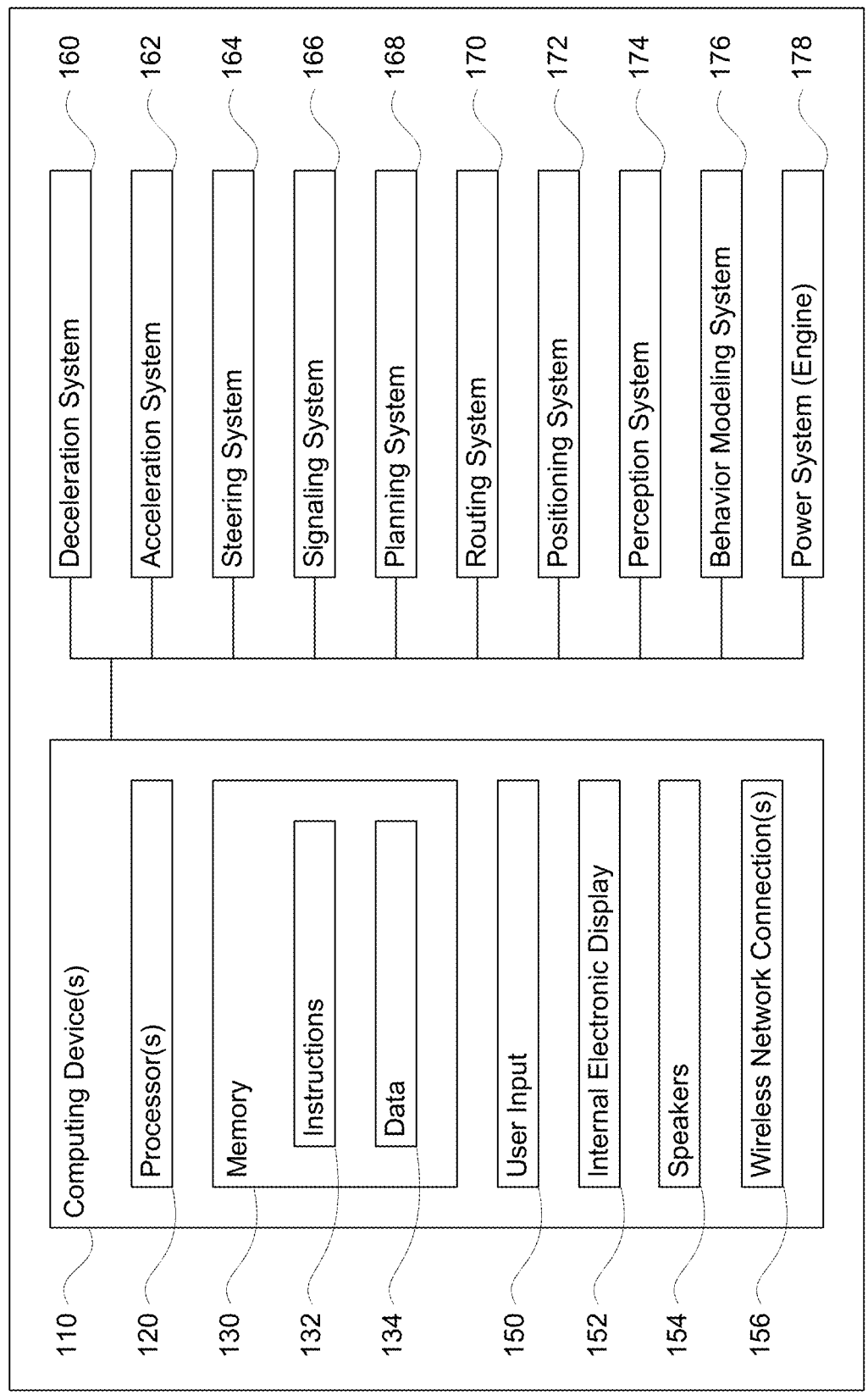
FIG. 1 is a functional diagram of an example vehicle in accordance with an exemplary embodiment.

The technology relates to identifying parkable areas for autonomous vehicles. In many cases, parkable areas such as parking spaces and parking lots may be known from any number of different sources such as city maps, parking databases, etc. However, there may be many cases where parkable areas are not necessarily defined other than by people deciding to park in such areas at certain times. For example, parkable areas are not always adjacent to curbs or along straight sections of a roadway, especially in residential areas. As another example, during religious services or on weekends near busy parks, it may be considered acceptable for vehicles to park in areas which are otherwise not parkable areas such as along a median, in a turning lane, or in a no-parking zone. In other examples, people may park vehicles on a side of a street where there is no curb.

As such, these parkable areas would not necessarily be pre-mapped or otherwise known and thus many not necessarily be available or even identifiable for autonomous vehicles. Manually mapping these parkable areas may be possible, but has a number of drawbacks; high-cost, require a well-defined specification upfront, require an iterative and slow creation and rollout, require work every time a roadgraph change occurs, and require a way of detecting when the annotations are out of date and require relabeling. However, many of the aforementioned parkable areas may be identified from logged data generated by autonomous vehicles.

As autonomous vehicles drive around, their various systems may detect and identify objects such as parked or slow-moving vehicles. This logged data may be analyzed to make certain determinations. For example, each time a detected object is identified or labeled as a parked vehicle, this may be considered an "observation."

In order to determine whether a vehicle has been observed parked at or adjacent to various features, sub-portions of each edge may be analyzed using the observations and may be classified or labeled. These observations may be further analyzed in order to determine other details about parkable areas for a given sub-portion.

These classifications and details may be used in any number of different ways. In some instances, the details and additional details may be used to add annotations to map information, and the annotated map information may be used for any number of different purposes as described below. In addition to or as an alternative to annotating map information, the observations, details and additional details may be used to train a model. The aforementioned annotated map information and/or the output of the model may then be used in various ways.

The features described herein may allow for the identification of parkable areas that are not necessarily defined other than by people deciding to park in such areas at certain times. In other words, the features described herein allow for the identification of parkable areas that are not necessarily defined by city maps, parking databases, etc.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the vehicle 100 or others as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the vehicle 100 and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of vehicle 100 in accordance with the instructions 132 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system 166 in order to signal the vehicle's intent to other drivers or vehicles, for example, by lighting turn signals or brake lights when needed.

Routing system 170 may be used by the computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 170 may store detailed map information, e.g., highly detailed maps identifying a road network including the shape and elevation of roadways, lane lines, intersections, crosswalks, speed limits, traffic signals, buildings, signs, real time traffic information (updated as received from a remote computing device, as such as the computing devices 410 discussed below or other computing devices), pullover spots, vegetation, or other such objects and information.

Figure 2:
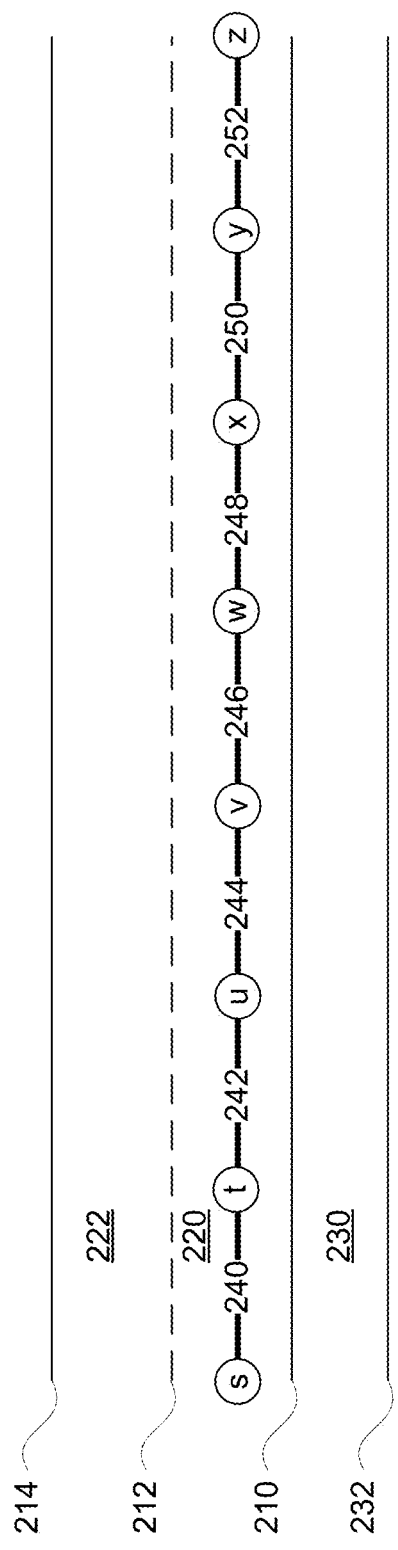
FIG. 2 is an example of map information in accordance with aspects of the disclosure.

FIG. 2 is an example of map information 200 for a small section of roadway. The map information 200 that includes information identifying the shape, location, and other characteristics of lane markers or lane lines 210, 212, 214, which define lanes 220, 222. The map information also identifies the shape, location, and other characteristics of shoulder area 230 and curb 232 adjacent to shoulder area. In addition to the aforementioned features and information, the map information may also include information that identifies the direction of traffic for each lane as well as information that allows the computing devices 110 to determine whether the vehicle has the right of way to complete a particular maneuver (i.e. complete a turn or cross a lane of traffic or intersection).

In addition to the aforementioned physical feature information, the map information may be configured as a roadgraph which includes a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

For example, FIG. 2 also depicts a plurality of nodes s, t, u, v, w, x, y, z, and edges 240, 242, 244, 246, 248, 250, 252 which extend between pairs of such nodes. For example, edge 240 extends between nodes s (starting node of edge 240) and t (ending node of edge 240), edge 242 extends between nodes t (starting node of edge 242) and u (ending node of edge 242), and so on.

The routing system 170 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may have the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 172 may be used by computing devices 110 in order to determine the vehicle's relative or absolute position on a map or on the earth. For example, the positioning system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise than absolute geographical location.

The positioning system 172 may also include other devices in communication with the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other vehicles, obstacles in the roadway, traffic signals, signs, trees, etc. For example, the perception system 174 may include LIDARs, sonar, radar, cameras and/or any other detection devices that record data which may be processed by the computing devices 110. In the case where the vehicle is a passenger vehicle such as a minivan, the minivan may include a laser or other sensors mounted on the roof or other convenient location.

Figure 3:
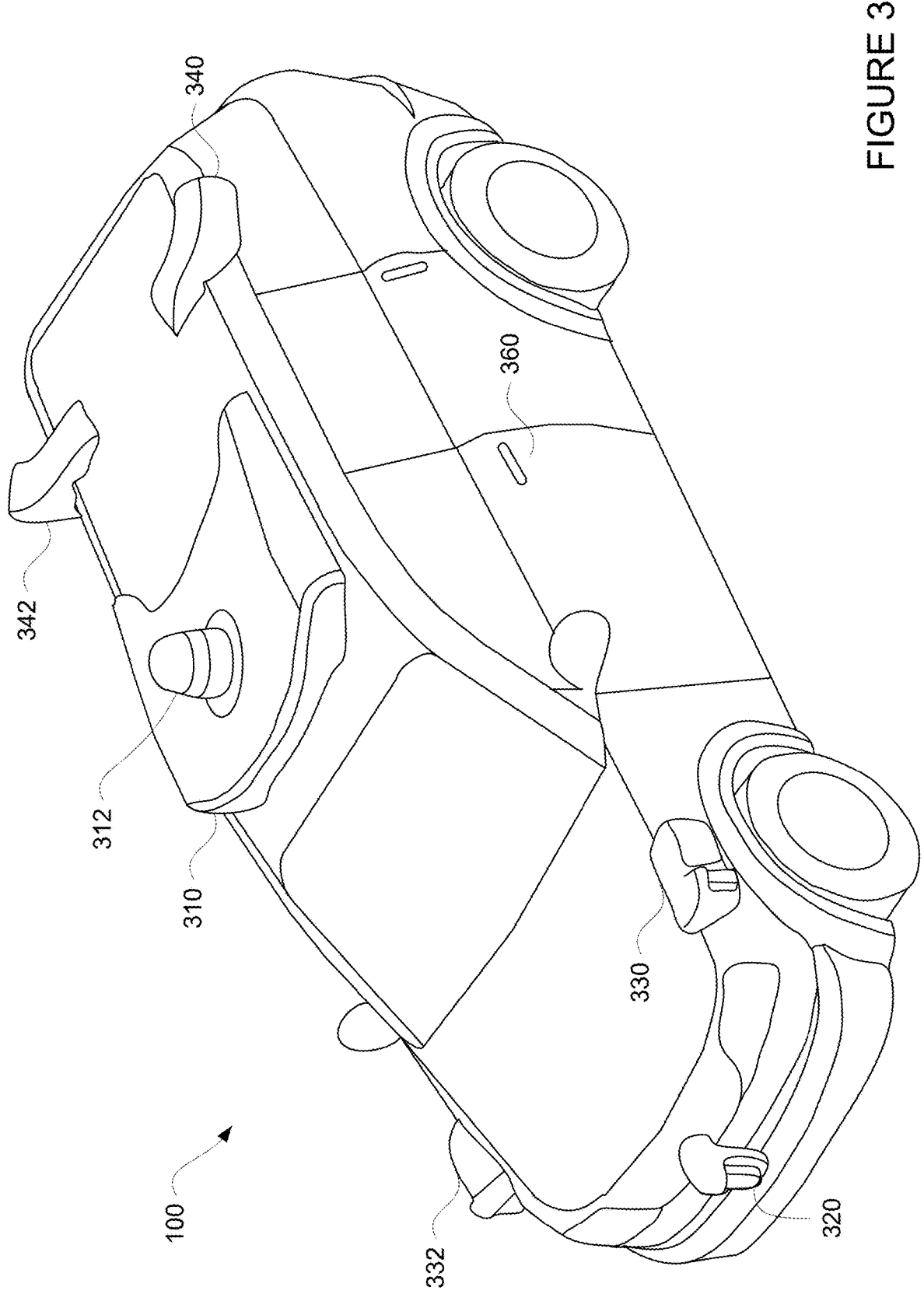
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 132 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 172 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 170. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 172 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
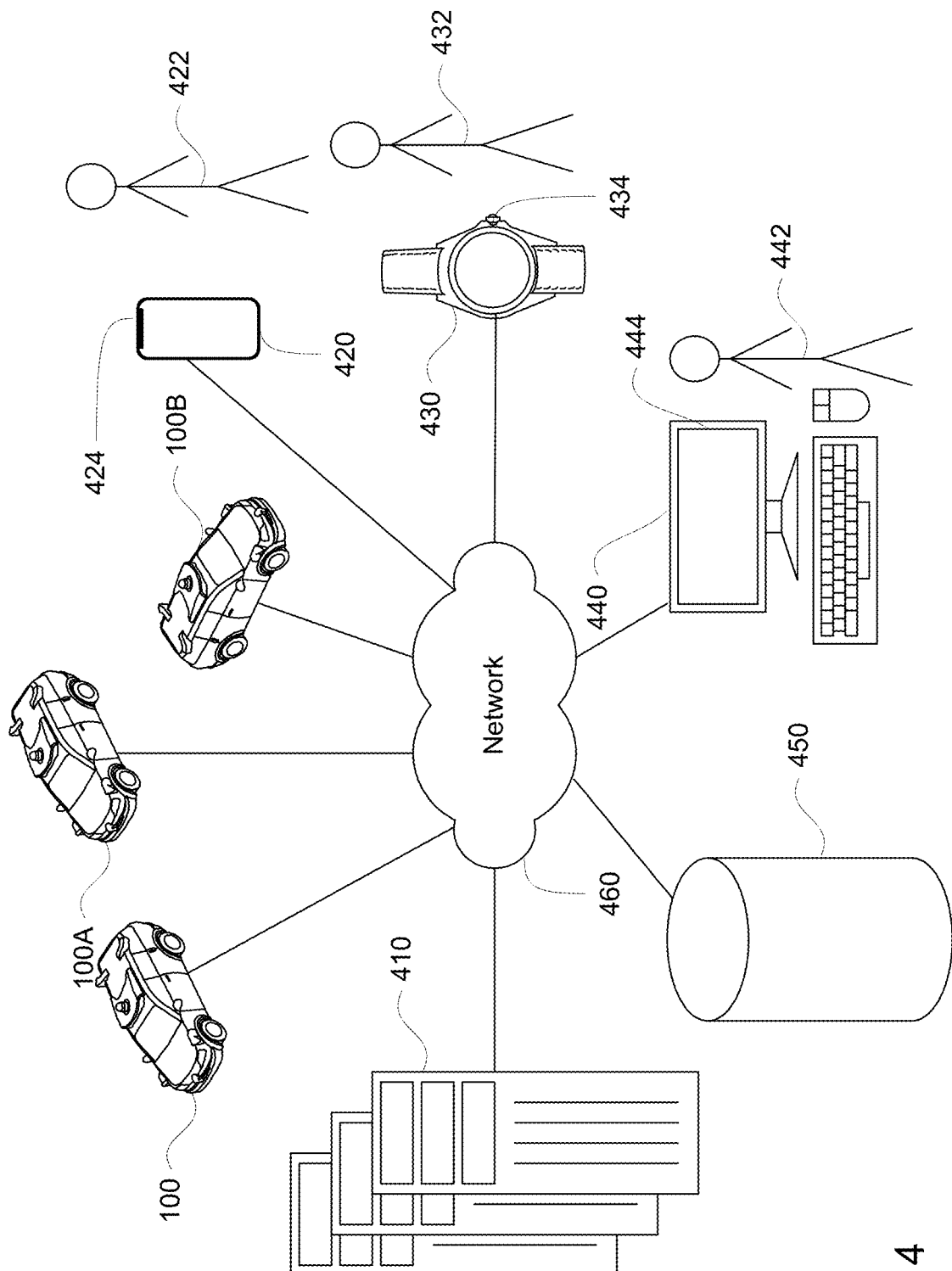
FIG. 4 is a pictorial diagram of an example system in accordance with aspects of the disclosure.
Figure 5:
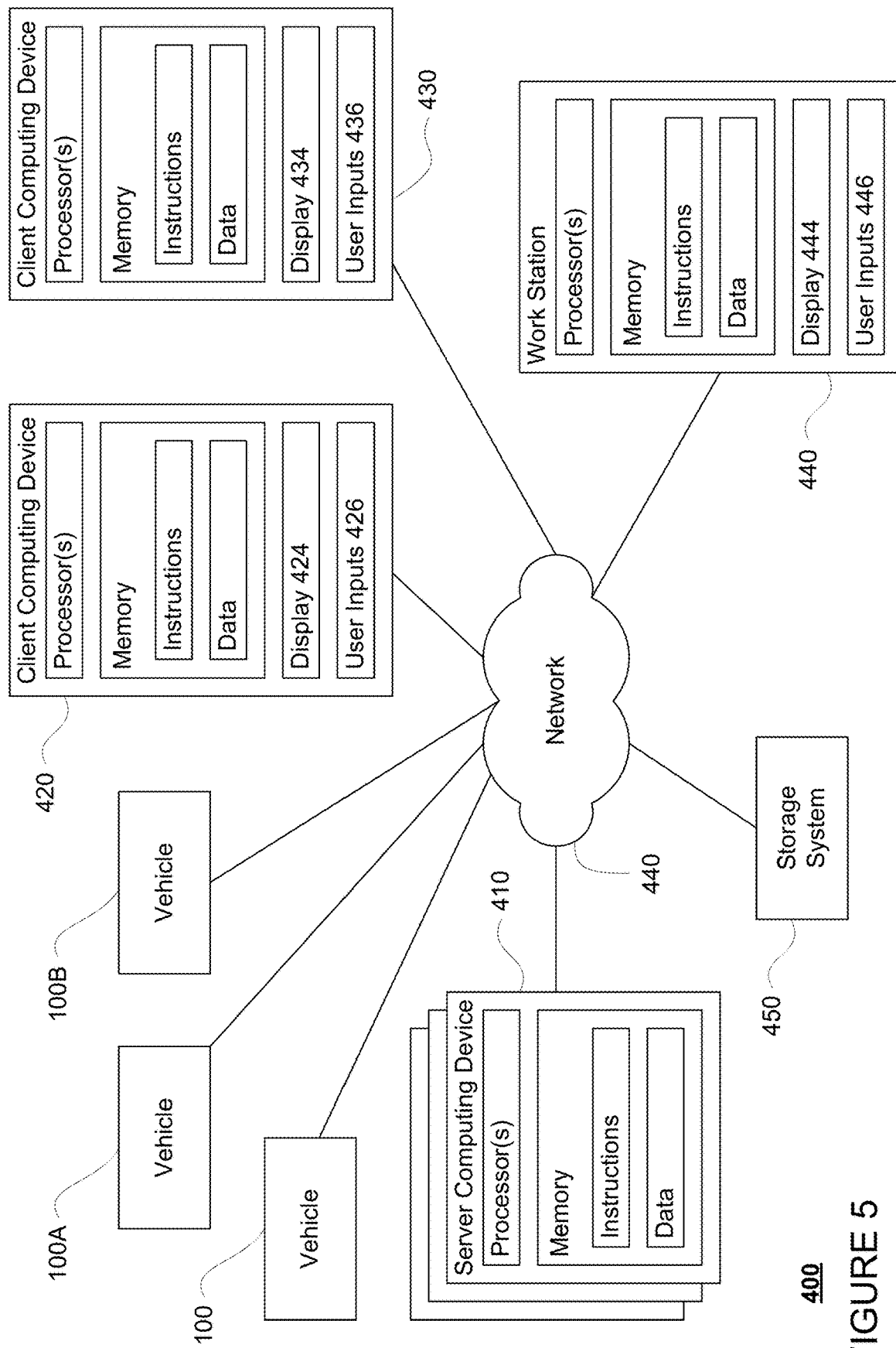
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100A and vehicle 100B, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A or vehicle 100B as well as computing devices 420, 430, 440 via the network 460. For example, vehicles 100, 100A, 100B, may be a part of a fleet of vehicles that can be dispatched by server computing devices to various locations. In this regard, the server computing devices 410 may function as a fleet management system which can be used to dispatch vehicles such as vehicles 100, 100A, 100B to different locations in order to pick up and drop off passengers. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

Each of the client computing devices may be remote computing device used by a person (e.g. human operators or users 422, 432, 442) to review and analyze sensor data and other information generated by a perception system of a vehicle such as perception system 174 of vehicle 100. For example, user 442 may use the client computing device 440 to review visualizations generated as discussed herein. Although only a few remote computing devices are shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, storage system 450 may store log data. This log data may include data generated by the various systems of a vehicle, such as vehicle 100, while the vehicle is being operated in a manual driving mode or an autonomous driving mode. For instance, the log data may include sensor data generated by a perception system, such as perception system 174 of vehicle 100. As an example, the sensor data may include raw sensor data as well as data identifying defining characteristics of perceived objects such as shape, location, orientation, speed, etc. of objects such as vehicles, pedestrians, bicyclists, vegetation, curbs, lane lines, sidewalks, crosswalks, buildings, etc.

As autonomous vehicles drive around, their various systems may detect and identify objects such as parked or slow-moving vehicles. For example, when an object is classified as a vehicle, a parked vehicle classifier may be used to determine whether the vehicle is parked or temporarily stopped (e.g. due to traffic conditions such as a red light or stop sign) and add an appropriate label. In this regard, the sensor data of the logged data may also identify observations of parked or stopped vehicles. In addition or alternatively, the logged data may be reviewed by human operators who can verify and/or add labels to vehicles.

The log data may also include "event" data identifying different types of events such as collisions or near collisions with other objects, planned trajectories describing a planned geometry and/or speed for a potential path of the vehicle, actual locations of the vehicle at different times, actual orientations/headings of the vehicle at different times, actual speeds, accelerations and decelerations of the vehicle at different times, classifications of and responses to perceived objects, behavior predictions of perceived objects, status of various systems (such as acceleration, deceleration, perception, steering, signaling, routing, planning, power, etc.) of the vehicle at different times including logged errors, inputs to and outputs of the various systems of the vehicle at different times, etc.

As such, the events and the sensor data may be used to "recreate" the vehicle's environment, including perceived objects, and behavior of a vehicle in a simulation. In some instances, the log data may be annotated with information identifying behaviors of the autonomous vehicle, such as passing, changing lanes, merging, etc., as well as with information identifying behaviors of other agents or objects in the log data, such as passing or overtaking the autonomous vehicle, changing lanes, merging, etc. In addition or alternatively, the "log data" may be simulated, that is may be created by a human operator as opposed to being generated from a real vehicle driving in the world.

The log data may be used by the server computing devices 410 to run simulations. These simulations may be log-based simulations which are run using actual log data collected by a vehicle over some brief period of time as the vehicle approaches a destination or simulated log data. At the same time, the actual vehicle is replaced with a virtual or simulated autonomous vehicle which can make decisions using the autonomous vehicle control software. By using simulations, the autonomous vehicle control software can be rigorously evaluated.

The log data and/or results of a simulation based on actual or simulated log data may include or be otherwise associated with an identified pullover location selected by the autonomous vehicle control software. In this regard, the storage system 450 may also store this information. In some instances, the actual or simulated vehicle may not actually be able to stop in the identified pullover location due to some circumstance such as an occluded object in the pullover location, etc. In such cases, the identified pullover location may be used for evaluation purposes, even when it is not the "true" pullover location for the actual or simulated vehicle.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 11:
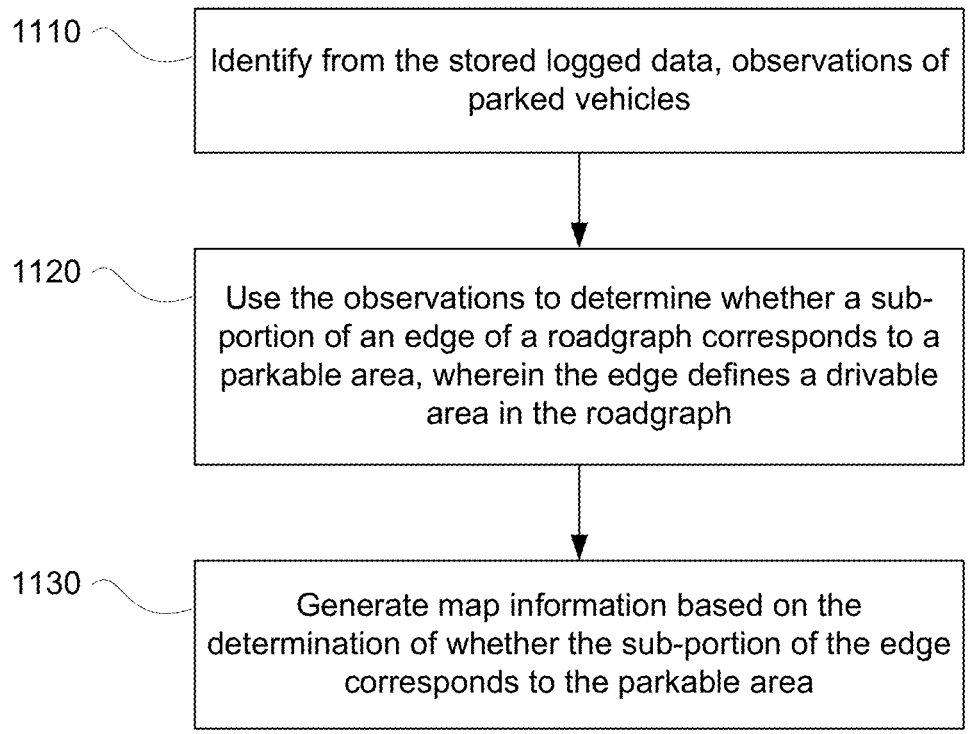
FIG. 11 is an example flow diagram in accordance with aspects of the disclosure.

FIG. 11 is an example flow diagram 1100 for identifying parkable areas, which may be performed by one or more processors of one or more computing devices, such as the processors of the server computing devices 410 or the processors of any of the client computing devices 420, 430, 440. At block 1110, observations of parked vehicles are identified from logged data.

As noted above, as autonomous vehicles, such as vehicles 100, 100A, 100B drive around, their various systems may detect and identify objects such as parked or slow-moving vehicles. For example, when an object is classified as a vehicle, a parked vehicle classifier may be used to determine whether the vehicle is parked or temporarily stopped (e.g. due to traffic conditions such as a red light or stop sign) and add an appropriate label. In addition or alternatively, the logged data may be reviewed by human operators who can verify and/or add labels to vehicles.

In some instances, the logged data may be analyzed to make certain determinations. For example, each time a detected object is identified or labeled as a parked vehicle, this may be considered an "observation" of a parked vehicle. In addition, observations of empty lanes, i.e. lanes observed with no parked vehicles, may also be used in order to be able to compute the percentage of time the given lane was seen occupied versus empty.

Figure 6:
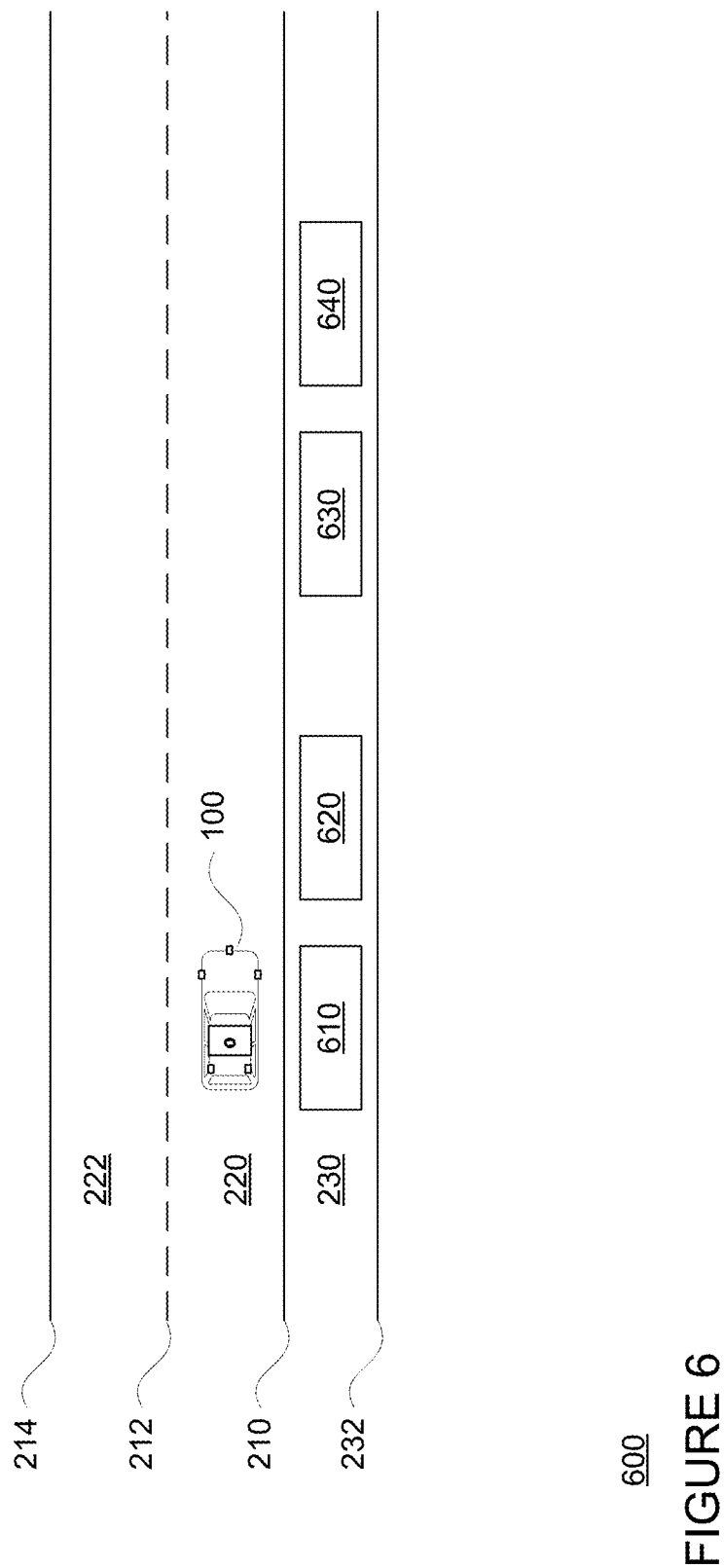
FIG. 6 is an example of log data and map information in accordance with aspects of the disclosure.

FIG. 6 represents an example of log data 600 which may have been captured by the various systems of vehicle 100 in a geographic area corresponding to that of the map information 200. In this regard, the map information 200 is also depicted for reference. In this example, the log data 600 includes information identifying various detected objects as well as the characteristics of those objects (e.g. location, type, heading, orientation, speed, acceleration, change in acceleration, size, shape, etc.). As such, the log data 600 identifies objects 610, 620, 630, 640 as well as the aforementioned characteristics for each of these objects and other information such as behavior predictions, etc. In this example, each of these objects may be associated with a label identifying the object as a parked vehicle. Accordingly, each of these objects may be considered an "observation" of a parked vehicle as discussed above. In addition, each of these objects may be represented by one or more bounding boxes generated by the perception system 174.

In some instances, these bounding boxes may be adjusted or refined by a vehicle's computing devices or in an offline process (e.g. at the server computing devices) using various smoothing and filtering techniques such as those described in U.S. Pat. No. 8,736,463, incorporated herein by reference, which involves attempting to increase or maximize the average density of data points of the disturbance along edges of a bounding box by adjusting parameters of the bounding box including at least one of a heading, a position, an orientation, and a dimension. This may therefore improve the dimensions of the bounding box as well as the pose (position and orientation) of the parked vehicle. This may result in the identification of false positive and potentially false negative classifications of parked vehicles.

The sensor data may include LIDAR data points, camera images, radar images, and/or sensor data generated by other types of sensors. The log data may also identify additional detected objects corresponding to the features of the map information such as the lane markers or lane lines 210, 212, 214, lanes 220, 222, shoulder area 230 and curb 232.

In some instances, duplicative observations of the same parked vehicle by different autonomous vehicles at around the same time can be discarded by the server computing devices 410. For instance, if both vehicle 100 and 100B were to drive through the area of map information 200 within some short period of time (such as a few minutes or more or less), the observations of objects 610, 620, 630, 640 for one of those vehicles may be discarded.

Returning to FIG. 11, at block 1120, the observations are used to determine whether a sub-portion of an edge of a roadgraph corresponds to a parkable area, wherein the edge defines a drivable area in the roadgraph. In order to determine whether a vehicle has been observed parked at or adjacent to various features, observations within a given geographic region may then be analyzed to determine whether a vehicle has been observed parked at or adjacent to various features (e.g. an edge) in a roadgraph. The analysis may include the server computing devices 410 examining the areas adjacent to sub-portions of each edge and classifying or labeling those areas. As an example, an edge may be subdivided into two or more sub-portions such as 0.2 meters from the start of an edge, 0.2 to 0.4 meters from the start of an edge, 0.4 to 0.6 meters from the start of an edge, and so on. Segmenting the edges may provide for more useful granularity in the identification of parkable areas (e.g.

not all edges may be adjacent to completely parkable areas and not all parkable areas may be the same length).

Areas directly adjacent to sub-portions that are occupied by a parked vehicle (e.g. a vehicle that was detected and classified as parked) may be identified as parkable areas. For instance, for each observation of a parked vehicle, the server computing devices may identify the closest sub-portions of an edge. A limit or threshold may be placed on the distance between an observation of a parked vehicle and a closest edge (or lane center), such as 50 meters or more or less. Above this threshold, an observation of a parked vehicle would not be associated with any sub portion of an edge or any lane and thus may be discarded (potentially as a false positive), though this may not be necessary in more urban areas.

Figure 7:
FIG. 7 is an example of edges and sub-portions in accordance with aspects of the disclosure.

FIG. 7 provides an example representation of sub-portions of the edges of the map information 200. In this example, each edge is divided into two sub-portions for simplicity and ease of understanding, though significantly more sub-portions may also be used in order to extract greater granularity in the analysis. Each of the edges S-Z are divided into sub-portions, resulting in sub-portions 701-715. As an example, edge 240 is subdivided into sub-portions 701 and 702, edge 242 is subdivided into sub-portions 703 and 704, and so on. The sub-portions are depicted adjacent to the edges only for ease of representation.

Figure 8:
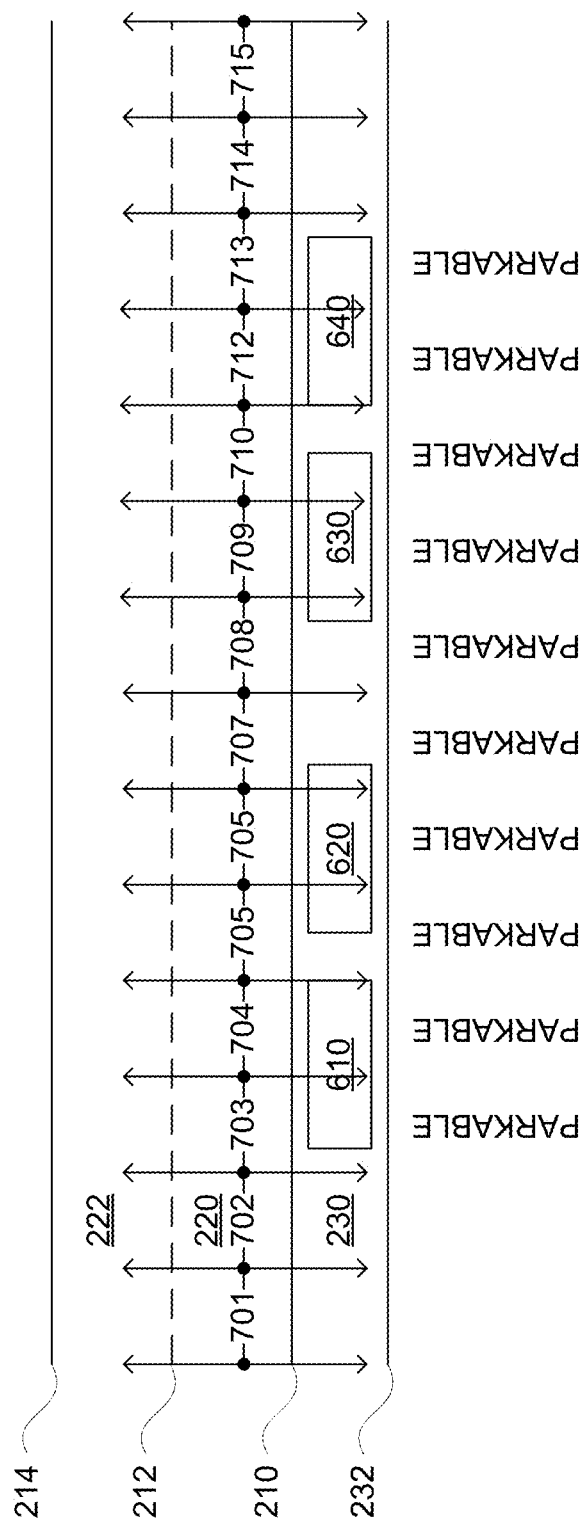
FIG. 8 is an example of log data, map information, and data in accordance with aspects of the disclosure.

FIG. 8 depicts the sub-portions 702-715 of FIG. 7 with respect to the log data 600. Using this example, areas to the "left" and "right" of the sub-portions of the edges S-Z may be analyzed by the server computing devices 410. In this regard, the server computing devices 410 may look for observations of parked vehicles in both the lane 222 as well as in the shoulder area 230. In this example, the observations of objects 610, 620, 630, 640 which are labeled as parked vehicles are analyzed to determine that each of the sub-portions 703-713 were occupied (at least in part) by a parked vehicle at the time that the log data 600 was captured and thus are "PARKABLE" or rather, parkable areas. Although the examples herein relate to the analysis of the observations of only log data from a single vehicle, the observations from a plurality of vehicles may be aggregated and analyzed at once.

Moreover, although the examples herein depict analysis of the log data using only the edges in lane 220, a similar process may also occur for other edges in the map information, such as those in lane 222 (not depicted). In this regard, the server computing devices 410 may look for observations of parked vehicles in both the lane 220 (below lane 222) as well as in the area above lane 222.

Figure 9:
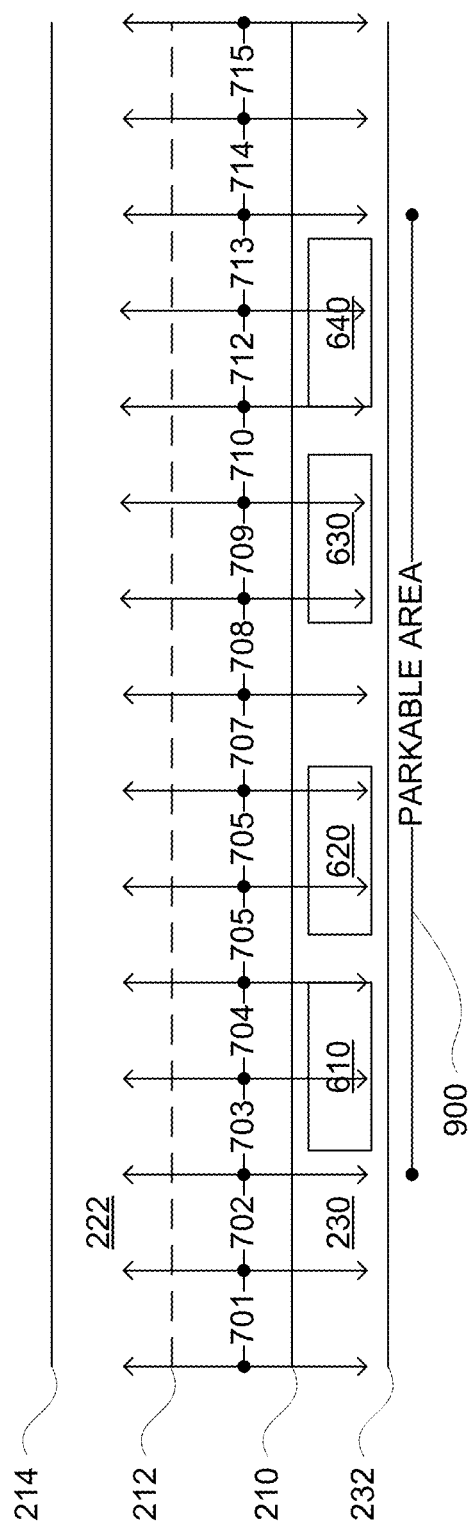
FIG. 9 is an example of log data, map information, and data in accordance with aspects of the disclosure.

Moreover, sub-portions adjacent to parkable areas may be "grouped" to identify with more specificity exactly what areas are parkable. In this regard, turning to the example of FIG. 9 which depicts the log data, map information and additional data, the areas adjacent to sub-portions 703-715 may be grouped together into a single, larger parkable area 900.

The observations may be further analyzed by the server computing devices 410 in order to determine details such as whether the observation was adjacent to the left or right of an edge, along an edge (e.g. in the center of a lane), or between two edges with opposite directions (e.g. between two lanes of traffic); the width of a parkable area for a given sub-portion (e.g. equal to or based on the width of the observed vehicle); the offset of a parkable area for a given sub-portion from a center of a lane (e.g. the closest roadgraph edge); the angle of parked cars relative to the edge (e.g. parallel or perpendicular); whether vehicles are backed in and what percentage of vehicles are backed in; the percentage of time a parkable area for a given sub-portion is occupied or not occupied (which may be described with further granularity by bucketizing this information for different periods of time such as different times of day, weekdays, versus weekends, etc.); whether the parkable area for the given sub-portion is designated for specific types of vehicles (e.g. buses or taxis by looking for "taxi" signs, color characteristics, etc.); whether there are nearby signs which might describe parking limitations; the color of a curb adjacent to the given sub-portion; the dimensions (e.g. length and width of observed parked vehicles), etc.

The analysis of the observations may be used to determine additional details about parkable areas for a given sub-portion. This may include for a given geographic area, the percentage of area that is parkable, average offset of parkable areas from the lane center, angle and direction (e.g. whether a vehicle would pull forward or back in), and so on. In addition to this information gleaned from the observations, the analysis of the observations may be used to make predictions about parkable areas such as what percentage of parkable areas is likely to be available at any given time.

Returning to FIG. 11, at block 1130, map information is generated based on the determination of whether the sub-portion of the edge corresponds to a parkable area. The classifications, details and additional details described above may be used in any number of different ways. In some instances, the details and additional details may be used by the server computing devices 410 to add annotations to map information (e.g. the roadgraph), and the annotated map information may be used for any number of different purposes as described below. The annotations may include the details and additional details such as, for example, the width of a parkable area for a given sub-portion (e.g. equal to or determined based on the width of the observed vehicle); the offset of a parkable area for a given sub-portion from a center of a lane (e.g. the closest roadgraph edge); the angle of parked cars relative to the edge (e.g. parallel or perpendicular); whether vehicles are backed in and what percentage of vehicles are backed in; the percentage of time a parkable area for a given sub-portion is occupied or not occupied (which may be described with further granularity by bucketizing this information for different periods of time such as different times of day, weekdays, versus weekends, etc.); whether the parkable area for the given sub-portion is designated for specific types of vehicles (e.g. buses or taxis by looking for "taxi" signs, color characteristics, etc.); whether there are nearby signs which might describe parking limitations; the color of a curb adjacent to the given sub-portion; the dimensions (e.g. length and width of observed parked vehicles), the percentage of area that is parkable, average offset of parkable areas from the lane center, angle and direction (e.g. whether a vehicle would pull forward or back in), etc.

Figure 10:
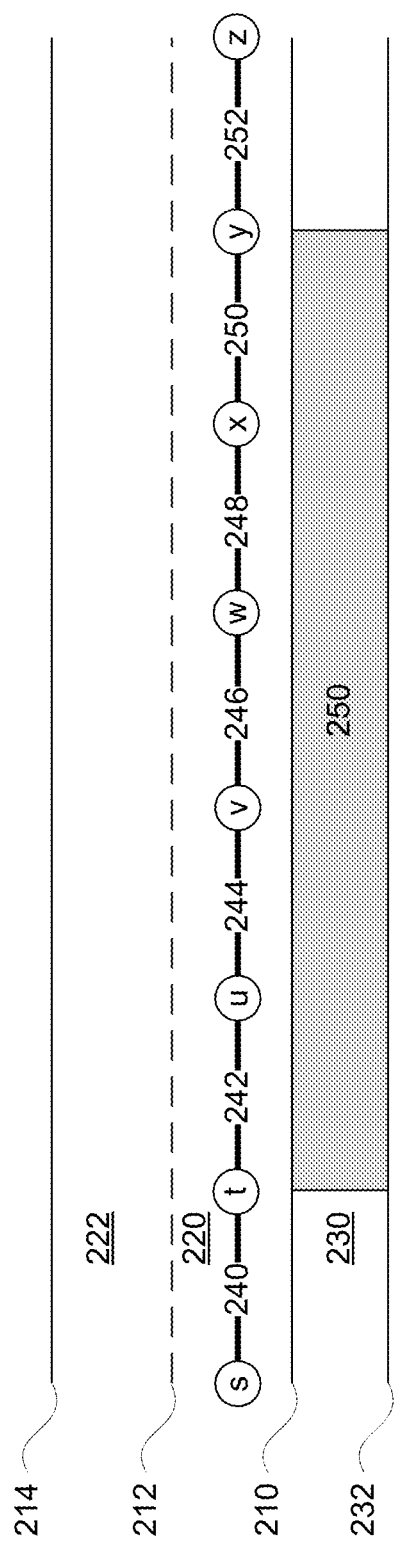
FIG. 10 is an example of annotated map information in accordance with aspects of the disclosure.

The offset and the width of the parkable area may be used to determine a 2D polygon. FIG. 10 is an example of annotated map information 200' including a parkable area 250 represented as a 2D polygon corresponding to the observed areas depicted in FIGS. 8 and 9.

In addition to or as an alternative to annotating map information, the observations, details and additional details may be used to train a model. The model may be a machine-learned model which takes an embedding of the roadgraph or a vectorized representation of a portion of the roadgraph, and outputs a list of roadgraph features (e.g. edges) and values identifying a likelihood of whether those roadgraph features are adjacent to a parkable area or not.

This model may be used offline or in real time by computing devices of autonomous vehicles for any number of different purposes as described further below.

The model may be trained using the aforementioned observations as training output and corresponding portions of the roadgraph as training input. In some instances, the results of the aforementioned analyses may also be used as training outputs. As such, the model may be trained using high-confidence historical data.

In one example, the training may be performed using unsupervised techniques by making assumptions about parkable areas. For example, lanes may be considered "parkable" if they have cars parked on them frequently considering neighboring lanes. This may reduce the likelihood of erroneous parked car detections in things like turn lanes, middle lanes, intersections. As another example, areas along a lane may be considered if they have a vehicle parked in them no less than some percentage of the time (such as 10% or more or less) of the time as the most parked part of the lane. This type of training may involve utilizing unsupervised (hyper parameter based) clustering algorithms involving segmentation, natural breaks optimization, or Kernel Density Estimation with classification based on thresholds.

In many instances, there may be very few or no observations of parked vehicles at certain times of days/days of the week. Various techniques may be used to infer parkable areas in unseen areas or areas with few observations. As one example, the model may be trained on available data and then used to make predictions for missing data (either for unobserved lanes and/or at certain days/hours).

The aforementioned annotated map information and/or the output of the model may be used in various ways. In this regard, the annotated map information and/or the output of the model may be sent to or otherwise downloaded to the memory of an autonomous vehicle for use by the various systems of the autonomous vehicle. As an example, the annotated map information may be provided by the server computing devices 410 as a map update to the computing devices of the vehicles of a fleet of autonomous vehicles, such as the computing devices 110 of the vehicles 100, 100A, 100B via the network 460.

For instance, the annotated map information and/or the output of the model may be used by the server computing devices 410 and/or an autonomous vehicle's computing devices to identify parkable areas in locations where there are not yet any or very few observations. As an example, roadgraph features may be input into the aforementioned model in order to provide a reasonable guess as to the availability of parking in various areas. Knowing where a possible parking area is may assist a behavior modeling system of an autonomous vehicle to generate behavior predictions that identify whether a vehicle is parked for example, as a check or supplement to the aforementioned parked vehicle classifier to reduce false positive detections of parked or unparked vehicles.

Similarly, this information may be useful to improve determinations by the computing devices of autonomous vehicles of whether another vehicle is engaged in an act of parking by a perception system of an autonomous vehicle, such as the perception system 174 of vehicle 100. This can be especially useful in parallel parking situations where there is another vehicle directly in front of the vehicle 100. This, in turn, may improve the vehicle 100's ability to react to vehicles engaged in an act of parking.

In other instances, the information may be used to make routing decisions by a routing system of an autonomous vehicle. For instance, the routing system 170 may penalize routes where the vehicle would have to drive down roads with parking on both sides (e.g. narrow roads). For example, if the routing system 170 classifies narrow lanes based on lane width, but knows to expect parallel parked cars, the routing system can subtract off the width of potential parallel parked cars from the drivable lane width and penalize (give a higher cost) to edges in the road graph with widths of a particular dimension or less (e.g. where two vehicles would have difficulty passing at the same time). In addition, the identification of potentially narrower lanes may be used to improve estimated times to traverse such areas as an autonomous vehicle would typically decrease its speed to improve safety.

A planning system of an autonomous vehicle may use this information when planning trajectories. For instance, the planning system 168 of vehicle 100 may use this information for planning the geometries of trajectories in order to position the vehicle for occluded areas. As an example, parked vehicles may occlude the areas in front of them, which can result in the autonomous vehicle not being able to detect if other vehicles are parked there or not being able to detect oncoming traffic in a narrow passage or around a bend. In this regard, in such situations, the planning system may plan trajectories or the routing system may plan routes that avoid certain roads which might result in such situations. As another instance, the planning system 168 may plan trajectories or the routing system 170 may plan routes by penalizing those that drive in a lane adjacent to parked cars.

The information may also be used by the computing devices 410 or other computing devices (e.g. computing devices of a dispatching system) to make decisions about pickup and drop off locations. For example, when suggesting locations for a trip, locations near areas where there is expected to have very little parking availability may be indicated to be less desirable or not available. As another example, knowing that some areas that are not typically parkable are parkable at certain times (e.g. the examples described above) may better allow an autonomous vehicle to find a location to park when it is ready to pullover to pick up or drop off passengers or goods or simply to wait between trips.

The features described herein may allow for the identification of parkable areas that are not necessarily defined other than by people deciding to park in such areas at certain times. In other words, the features described herein allow for the identification of parkable areas that are not necessarily defined by city maps, parking databases, etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
    identifying, by one or more processors, from logged data, observations of one or more vehicles parked in an area identified as not parkable in a roadgraph;
    determining, by the one or more processors based on the observations of the one or more vehicles parked in the area identified as not parkable in the roadgraph whether a sub-portion of an edge in the area identified as not parkable in the roadgraph, corresponds to a parkable area irrespective of the sub-portion of the edge being in the area identified as not parkable in the roadgraph, wherein the edge comprises a distance between two graph nodes of the roadgraph and defines a drivable area in the roadgraph; and
    responsive to determining that the sub-portion of the edge in the area identified as not parkable in the roadgraph corresponds to the parkable area, generating, by the one or more processors, map information associated with the area identified as not parkable.

2. The method of claim 1, further comprising, using the observations of the one or more vehicles in the area identified as not parkable in the roadgraph to determine whether a second sub-portion of the edge corresponds to a second parkable area.

3. The method of claim 1, further comprising, further analyzing the observations of the one or more vehicles parked in the area identified as not parkable in the roadgraph to determine whether the parkable area is left of the edge.

4. The method of claim 1, further comprising, further analyzing the observations of the one or more vehicles parked in the area identified as not parkable in the roadgraph to determine whether the parkable area is along the edge.

5. The method of claim 1, further comprising, further analyzing the observations of the one or more vehicles parked in the area identified as not parkable in the roadgraph to determine whether the parkable area is between the edge and a second edge of the roadgraph.

6. The method of claim 1, further comprising, further analyzing the observations of the one or more vehicles parked in the area identified as not parkable in the roadgraph to determine a width of the parkable area.

7. The method of claim 1, further comprising, further analyzing the observations of the one or more vehicles parked in the area identified as not parkable in the roadgraph to determine a percentage of time that the parkable area was occupied by a vehicle.

8. The method of claim 1, further comprising, further analyzing the observations of the one or more vehicles parked in the area identified as not parkable in the roadgraph to determine likelihoods of the parkable area being available during a plurality of different periods of time.

9. The method of claim 1, further comprising, using the observations of the one or more vehicles parked in the area identified as not parkable in the roadgraph to train a machine learned model to provide a likelihood of the parkable area being occupied at some point in the future.

10. The method of claim 9, further comprising further analyzing the observations of the one or more vehicles parked in the area identified as not parkable in the roadgraph to determine a percentage of time that the parkable area was occupied by a vehicle, and using the percentage of time to train the model.

11. The method of claim 9, further comprising, providing the model to an autonomous vehicle to enable the autonomous vehicle to use the model to make driving decisions.

12. The method of claim 1, further comprising, using the map information to identify potential locations for a vehicle to stop and pick up or drop off passengers or goods.

13. The method of claim 1, further comprising updating the roadgraph to identify the area identified as not parkable, as parkable.

14. A system comprising:
    memory storing logged data; and
    one or more processors configured to:
        identify from the stored logged data, observations of one or more vehicles parked in an area identified as not parkable in a roadgraph;
        determine, based on the observations of the one or more vehicles parked in the area identified as not parkable in the roadgraph, whether a sub-portion of an edge in the area identified as not parkable in the roadgraph corresponds to a parkable area irrespective of the sub-portion of the edge being in the area identified as not parkable in the roadgraph, wherein the edge comprises a distance between two graph nodes of the roadgraph and defines a drivable area in the roadgraph; and
        responsive to a determination that the sub-portion of the edge in the area identified as not parkable in the roadgraph corresponds to the parkable area, generate map information associated with the area identified as not parkable.

15. The system of claim 14, wherein the one or more processors are further configured to use the observations of the one or more vehicles parked in the area identified as not parkable in the roadgraph to determine whether a second sub-portion of the edge corresponds to a second parkable area.

16. The system of claim 14, wherein the one or more processors are further configured to further analyze the observations of the one or more vehicles parked in the area identified as not parkable in the roadgraph to determine whether the parkable area is between the edge and a second edge of the roadgraph.

17. The system of claim 14, wherein the one or more processors are further configured to further analyze the observations of the one or more vehicles parked in the area identified as not parkable in the roadgraph to determine a percentage of time that the parkable area was occupied by a vehicle.

18. The system of claim 14, wherein the one or more processors are further configured to further analyze the observations of the one or more vehicles parked in the area identified as not parkable in the roadgraph to determine likelihoods of the parkable area being available during a plurality of different periods of time.

19. The system of claim 14, wherein the one or more processors are further configured to provide the map information to an autonomous vehicle to enable the autonomous vehicle to use the map information to make driving decisions.

20. The system of claim 14, wherein the one or more processors are further configured to use the observations to train a machine learned model to provide a likelihood of the parkable area being occupied at some point in the future.

21. The system of claim 14, wherein the one or more processors are further configured to use the map information to identify potential locations for a vehicle to stop and pick up or drop off passengers or goods.

* * * * *